April 17, 1945.  S. G. DOWN ET AL  2,374,002
VARIABLE LOAD BRAKE
Filed Nov. 27, 1943
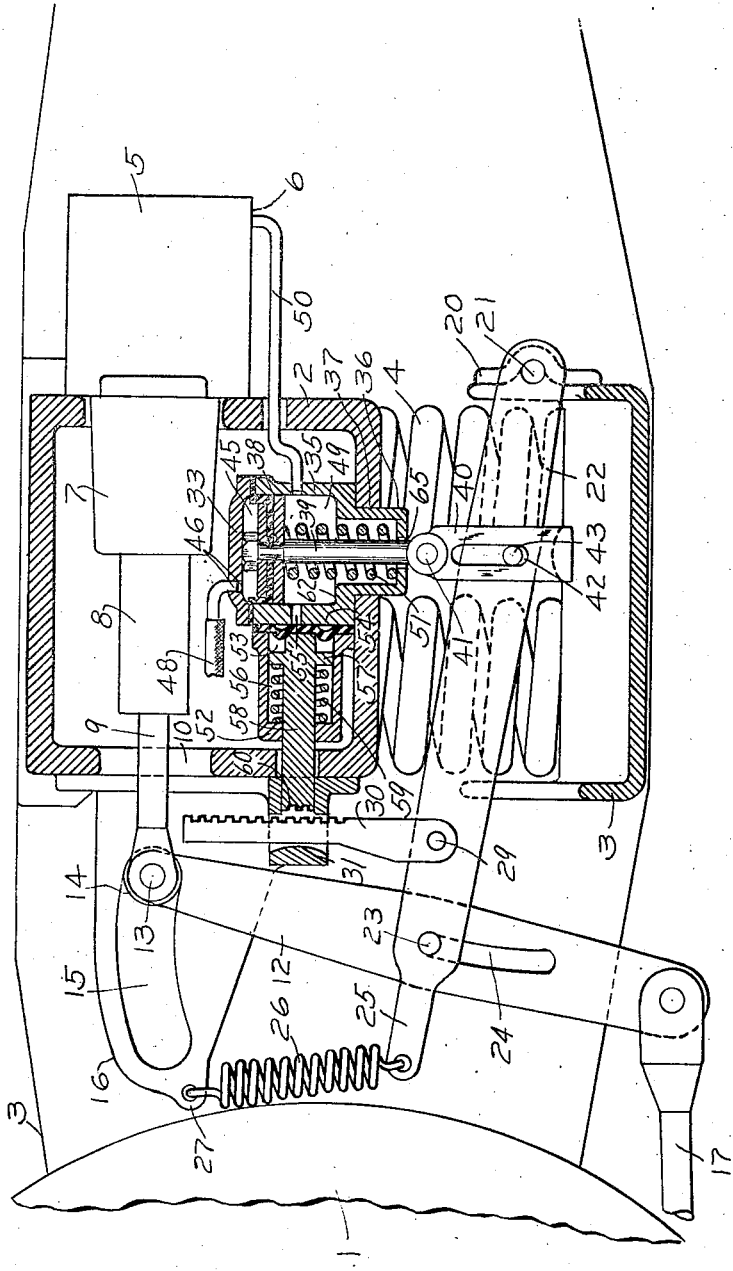
INVENTOR
SIDNEY G. DOWN
CLYDE C. FARMER
BY
ATTORNEY Patented Apr. 17, 1945

2,374,002

UNITED STATES PATENT OFFICE 2,374,002

VARIABLE LOAD BRAKE

Sidney G. Down, Edgewood, and Clyde C. Farmer, Pittsburgh, Pa., assignors to The Westinghouse Air Brake Company, Wilmerding, Pa., a corporation of Pennsylvania Application November 27, 1943, Serial No. 511,906

7 Claims. (Cl. 188—195)

This invention relates to railway vehicle brake apparatus and more particularly to variable load brake rigging of the type in which the leverage may be automatically varied in accordance with variations in the weight of the load on the vehicle to correspondingly vary the force with which the brake is adapted to be applied.

An object of the invention is to provide an improved variable load brake apparatus of the above-mentioned type.

Another object of the invention is to provide a variable load brake rigging of the above-mentioned type which is so constructed and arranged that it will be automatically conditioned or changed over for either empty or load braking by fluid under pressure upon initiating an application of the brakes.

A further object of the invention is to provide compact automatically operative means for automatically and positively locking the rigging in any of its conditioned positions when initiating an application of the brakes and for automatically unlocking the rigging when effecting a release of the brakes.

Other objects and advantages will appear in the following detailed description.

In the accompanying drawing the single figure is a fragmentary diagrammatic vertical sectional view taken longitudinally of a railway vehicle truck embodying the invention, parts of the truck and of the brake rigging, not necessary for a clear understanding of the invention, being omitted.

As shown in the drawing, the variable load brake apparatus is applied to a railway vehicle truck which may be of the usual well known construction having longitudinally spaced wheel and axle assemblages 1, only a portion of the wheel at one end of the truck being shown, a hollow truck bolster 2, laterally spaced side frames which are rigidly carried in the usual manner by the wheel assemblages and a laterally extending spring plank 3 which is carried by the truck side frames and upon which the usual truck bolster supporting springs 4 seat.

The apparatus comprises a brake cylinder 5 of the usual well known type having a cylinder portion 6 which is secured in any suitable manner to one side of the bolster 2. The cylinder portion 6 is closed at one end by the usual non-pressure head 7 which extends into the space between the opposite sides of the bolster. Contained in the cylinder portion 6 is the usual piston (not shown) having a hollow sleeve 8. The sleeve 8 projects beyond the outer end of the non-pressure head 7 within the bolster 2. Rockably mounted in the sleeve 8 is the usual push rod 9 which extends to the exterior of the bolster through a suitable opening 10 provided in one side wall of the bolster. The outer end of the push rod 9 is operatively connected to one end of a vertically disposed brake cylinder lever 12 by means of a pin 13.

The pin 13, in addition to connecting the adjacent ends of lever 12 and push rod 9 together, also carries a roller 14 which is adapted to travel in a guide slot 15 provided in a bracket 16 carried by the bolster 2.

The opposite end of the brake cylinder lever 12 is operatively connected to one end of a longitudinally extending pull rod 17. The opposite end of this pull rod is connected to other brake rigging elements of the type shown in our copending application Serial No. 464,346, filed November 3, 1942.

Rigidly atached to the spring plank 3 and extending outwardly from one side thereof is a bracket 20 which carries a pin 21 upon which is pivotally mounted the inner end of a fulcrum shifting lever 22. The lever 22 extends in the direction longitudinally of the truck and across spring plank to and terminates at a point located a short distance beyond the spring plank. Adjacent its outer end this fulcrum lever carries a pin 23 which passes through a slotted opening 24 formed in and extending longitudinally of the brake cylinder lever 12, which pin serves as a fulcrum for the brake cylinder lever.

The fulcrum lever 22, adjacent the outer end thereof, is provided with an extension 25 to the outer end of which one end of a coil spring 26 is secured. The opposite end of the spring 26 is connected to a lug 27 carried by the bracket 16. The spring 26, at all times, biases the lever 22 and thereby the pin 23 toward its uppermost position in the slotted opening 24. The lever 22 is also connected by means of a pin 29 to the lower end of a vertically disposed upwardly extending serrated or toothed locking bar 30 which is slidably guided vertically in a portion 31 carried by the bracket 16.

For shifting the lever 22 and thereby the pin 23 relative to the brake cylinder lever 12 within the slotted opening 24, so as to provide a higher leverage ratio for a loaded car than for an empty car, and for maintaining the lever and thereby the pin in its adjusted position, a combined adjusting and locking mechanism 33 is provided.

The space available for installing variable load brake equipment on most railway vehicles is very limited thereby rendering it difficult to equip vehicles wtih such equipment without considerable change in design. In order to overcome this difficulty and at the same time guard against damage to certain parts of the apparatus, the combined adjusting and locking mechanism is contained inside the bolster 2. This mechanism comprises a hollow casing 35 which is located within the bolster and which is secured thereto in any suitable manner, which casing is provided with an extension 36 which extends to the exterior of the bolster through a suitable opening 37 in the bottom wall of the bolster. Contained in this casing is a piston 38 having a stem 39 which projects downwardly therefrom to the exterior of the extension 36. The piston stem 39 is operatively associated with the fulcrum lever 22 through the medium of a link 40 which is pivotally connected to the stem by means of a pin 41. The link is provided with slotted opening 42 through which a pin 43 carried by the lever 22 passes.

At one side of the piston 38 there is a chamber 45 which is in constant open communication with a passage and pipe 46, which pipe in turn is connected to a flexible hose 48 leading to the usual brake controlling valve device (not shown). The flexible hose 48 is provided for the purpose of accommodating relative vertical movement between said brake controlling valve device, which may be rigidly mounted on the truck frame, and the casing 35, carried by the bolster 2.

At the opposite side of the piston 38 there is a chamber 49 which is connected by way of a passage and pipe 50 to the brake cylinder device 5. Contained in the chamber 49 and interposed between the piston and the lower inner wall of the chamber is a spring 51, which tends, at all times to urge the piston 38, stem 39 and connected link 40 upwardly to the position in which they are shown.

Clamped between the casing 35 and a horizontally extending cap portion 52 is a flexible diaphragm 53. At one side of this diaphragm there is a chamber 54 which is normally connected through a passage 55 in a wall of the casing 35 to the chamber 49.

At the opposite side of the diaphragm 53 there is a chamber 56. Operatively associated with this diaphragm and extending through chamber 56 and suitable openings provided in the end portion of the cap portion 52 and adjacent side wall of the bolster 2 is a locking member or stem 58. Also contained in the chamber 56 and interposed between and operatively engaging the end wall of the cap 52 and a guide collar 57 carried by the stem is a spring 59 which tends, at all times, to urge the stem and thereby the diaphragm 53 inwardly toward the position in which they are shown.

The outer end of the stem 58 is provided with teeth 60 which are adapted to be moved into and out of locking engagement with the teeth of the locking bar 30 hereinbefore mentioned.

It is obvious that any variation in the position of the fulcrum pin 23 with relation to the brake cylinder lever 12 will result in variations in the leverage of the brake rigging and thereby a variation in the braking power of the brake rigging.

If the fulcrum pin 23 is moved longitudinally of the lever in a direction away from the brake cylinder push rod 9, the arm of the brake cylinder lever 12 to which the push rod is connected, will be correspondingly lengthened in effect, so that when the brake cylinder is operated the power transmitted by the opposite end of the lever 12 to the pull rod 17 will be correspondingly increased.

If the pin is moved in the direction toward the push rod 9 the effective length of the arm is reduced and as a consequence power transmitted from the lever to the pull rod will be decreased.

*Operation*

Assume the vehicle, embodying the invention, to be empty and the brakes on the vehicle released. Under these conditions the several parts of the apparatus will be in the position in which they are shown in the drawing.

When it is desired to effect an application of the brakes, fluid under pressure is supplied in the usual well known manner to the flexible hose 48 from whence it flows by way of pipe and passage 46 to piston chamber 45 in the casing 35 of the mechanism 33. Fluid under pressure thus supplied to chamber 45 and acting on piston 38 in opposition to pressure of spring 51, causes the piston to move downwardly, from the position in which it is viewed in the drawing.

The piston as it is thus moved causes the piston stem 39 and connected link 40 to move in the same direction, the link 40, by reason of the slotted opening 42, therein, moving relative to the pin 43. This downward movement of the piston stem and link continues, until brought to a stop by the piston engaging a shoulder 62 formed in the casing 35.

It should here be mentioned that when the vehicle is empty, the truck bolster 2 will be in its normal or uppermost position as shown, so that when fluid under pressure is supplied to chamber 45 in the manner above described, the piston 38 can move its full stroke, i. e., to the position just described, before the pin 43 carried by the lever 22 will engage the upper end of the slot 43 in the link 40. From this it will be seen, that when the vehicle is empty, operation of the piston 38 will not effect movement of the lever 22 and the spring 26 will act to maintain the lever 22 and thereby the fulcrum pin 23 in the position in which it is shown.

It should also be mentioned that the spring 51 opposing downward movement of piston 38 has a low pressure value, thus a slight increase in fluid under pressure in chamber 45 is all that is necessary to cause the piston, piston stem and link to make its full downward stroke.

When the piston 38 has been moved to its lowermost or stopped position, the upper face of the piston will be below the passages 50 and 55 leading to the brake cylinder 5 and the chamber 54, respectively. With the piston in this position, communication will be established between chambers 45 and 54 also between chamber 45 and the brake cylinder device 5.

With the communication between chambers 45 and 54 thus established, fluid under pressure supplied to chamber 45 flows by way of passage 55 to chamber 54. Fluid under pressure thus supplied to chamber 54 and acting on diaphragm 53 will cause the diaphragm to deflect in a direction toward the left-hand, as viewed in the drawing, against the opposing pressure of the spring 59. Flexing of the diaphragm in this direction will cause the stem 58 and thereby collar 57 to move in the same direction, thereby causing the teeth 60 formed on the end of said stem to interlock with the teeth of the locking bar 30, thus locking the bar 30, and lever 22 and thereby the fulcrum pin 23 in the position at the upper end of the slotted opening 24 in the brake cylinder lever 12 as shown until such time as the pressure in chamber 54 is reduced below the value of spring 59.

With the communication between chamber 45 and the brake cylinder device established, in the manner above described, fluid under pressure in chamber 45 flows by way of passage and pipe 50 to the brake cylinder device. It should here be mentioned that the spring 59 in the locking mechanism is of such value that it will yield to the power transmitted by the diaphragm 53 before the pressure of fluid in the brake cylinder device is sufficiently high to effect movement of the brake cylinder push rod 9 in its brake applying direction.

After the mechanism has been locked as above described, pressure of fluid in the brake cylinder device will continue to be increased so as to cause the brake cylinder to function to operate the push rod 9 and thereby the brake cylinder lever 12 and the associated pull rod 17 to effect an application of the brakes in the usual manner.

To initiate a release of the brakes, fluid under pressure is vented from the flexible hose 48 and consequently from the chambers 45 and 54 to the atmosphere. Since the brake cylinder device is in open communication with the chamber 45, fluid under pressure will be vented from the brake cylinder device by way of pipe and passage 50 and chamber 45. When, after the pressure of fluid in the brake cylinder device has been reduced sufficiently to effect the release of the brakes, the pressure in chamber 54 reduces to a slight degree below the opposing pressure of the spring 59, the spring acting through the medium of the collar 57 will move the stem and thereby the teeth 60 out of locking engagement with the toothed locking bar 30 thus unlocking the lever 22 and thereby the fulcrum pin 23. When the pressure in chamber 45 has been reduced sufficiently, the spring 51 will act to return the piston 38, stem 39 and link 40 to the position in which they are shown in the drawing. It will here be noted that when the piston 38 is returned to this position, the passages 55 will establish communication between chambers 54 and 49 and the passage 50 will establish communication between the brake cylinder device and chamber 49. The chamber 49 is connected to the atmosphere by way of a clearance space 65 between the stem 39 and the casing 35. With the piston thus positioned, the final release of fluid under pressure from the brake cylinder and from chamber 54 to the atmosphere will be by way of chamber 49 and clearance space 65.

Assuming now that, while the brakes are released, lading is placed on the body of the vehicle. Under the influence of the additional weight which the lading imposes on the truck bolster 2 of each truck, the bolster springs 4 will yield and permit the bolster to move downwardly relative to the spring plank 3 and the truck frames.

Since the combined adjusting and locking mechanism 33 is carried by the bolster it will move bodily with the bolster relative to the spring plank. Upon such movement the piston 38, stem 39 and link 40 are caused to move relative to the pin 43 carried by the lever 22, such movement being accommodated by the slot 42 in the link 40. As the movement continues the clearance between the upper end of the slot 42 and the pin 43 is reduced to a degree proportionate to the load imposed on the body of the vehicle.

Now when an application of the brakes is initiated the piston 38, will function to cause the stem 39 and link 40 to move downwardly to the stopped position in the same manner as hereinbefore described in connection with empty vehicle braking. Since the clearance between the end of the slot 42 and the pin 43 has been reduced due to relative movement between the bolster and the spring plank, downward movement of the piston will cause the upper end of the slot 42 in the link 40 to engage the pin 43 before the piston completes its full travel. Now, after the pin 43 is thus engaged, continued movement of the piston in this direction causes the lever 22 to rock about the pivot pin 21 in a counterclockwise direction. As the lever 22 rocks in this direction it carries the fulcrum pin 23 and locking bar 24 with it thereby automatically adjusting the pin 23 relative to the brake cylinder lever 9 to provide for the degree of braking called for by the weight of the lading carried by the vehicle.

When the piston 38 has completed its travel the proper adjustment will have been made and the piston will again be in a position to establish communication between chambers 45 and 54 and between chamber 45 and the brake cylinder device 5.

With the communication between chamber 45 and 54 established, fluid under pressure flows from chamber 45 to chamber 54, so that the locking mechanism operates in the manner hereinbefore described in connection with empty vehicle braking to lock the fulcrum lever and thereby the fulcrum pin 23 in its adjusted position. After the locking mechanism has thus operated to lock the fulcrum pin in its adjusted position, the continued increase in the pressure of fluid in chamber 45 and consequently in the brake cylinder device causes said brake cylinder device to function to effect an application of the brakes.

When it is desired to effect a release of the brakes, fluid under pressure is vented from the chamber 45 and as a consequence the brakes are released and the fulcrum pin 23 returned to the position in which it is maintained by the weight of the load carried by the vehicle in identically the same manner as hereinbefore described in connection with a release of the brakes on an empty vehicle.

Having now described our invention, what we claim as new and desire to secure by Letters Patent, is:

1. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, an adjustable fulcrum for said brake lever having a position for empty vehicle braking and being movable therefrom to various other positions through a loaded vehicle zone for providing loaded vehicle braking, a member pivotally mounted on said spring plank operative to position said adjustable fulcrum in accordance with the load carried by the vehicle, locking means for locking said member and thereby said fulcrum in any adjusted position, and fluid pressure responsive means disposed interiorly of said hollow bolster and operative by an increase in fluid under pressure supplied thereto for controlling the operation of said member, said locking means and the supply of fluid under pressure to said brake cylinder.

2. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, an adjustable fulcrum for said brake lever having a position for empty vehicle braking and being movable therefrom to various other positions through a loaded vehicle zone for providing loaded vehicle braking, a member disposed below said bolster and pivotally connected at one end to said spring plank operative to position said adjustable fulcrum in accordance with the load carried by the vehicle, a toothed bar located exteriorly of said bolster and operatively connected to said member, locking means carried interiorly of said bolster comprising a slidably mounted member for movement into locking engagement with said bar, and fluid pressure responsive means carried interiorly of said bolster and operative by an increase in the pressure of fluid supplied thereto for controlling the operation of said member, said locking means and the supply of fluid under pressure to said brake cylinder.

3. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, an adjustable fulcrum for said brake lever having a position for empty vehicle braking and being movable therefrom to various other positions through a loaded vehicle zone for providing loaded vehicle braking, a member disposed below said bolster pivotally connected at one end to said spring plank and operative to position said adjustable fulcrum in accordance with the load carried by the vehicle, a toothed bar located exteriorly of said bolster and operatively connected to said member intermediate said bolster and said brake member, a stem slidably mounted for movement into locking engagement with said bar, a movable abutment disposed interiorly of the bolster and operative by fluid under pressure supplied thereto for actuating said stem, and fluid pressure responsive means located interiorly of said bolster operative upon an increase in fluid under pressure supplied thereto for first actuating said member to position said adjustable fulcrum and for simultaneously supplying fluid under pressure to said movable abutment and said brake cylinder device.

4. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, an adjustable fulcrum pin for said brake lever having a position for empty vehicle braking and being movable therefrom to various other positions through a loaded vehicle zone for providing loaded vehicle braking, a member disposed below said bolster and pivotally connected at one end to said spring plank operative to position said adjustable fulcrum pin in accordance with the load carried by the vehicle, a brake lever hanger and guide member carried by said bolster, a spring interposed between and operatively connected to said hanger and said member for normally maintaining said member and thereby said adjustable fulcrum pin in the position for empty vehicle braking, locking means operative to lock said member and thereby said fulcrum pin in its adjusted position, and fluid pressure responsive means carried interiorly of said bolster and responsive to an increase in the pressure of fluid supplied thereto for first effecting operation of said member to shift said fulcrum pin and for then effecting operation of said locking means to lock said member and thereby said fulcrum pin in the position to which it is shifted and to at the same time supply fluid under pressure to said brake cylinder device.

5. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, a member disposed below and extending transversely of said bolster, said member carrying adjacent one end thereof an adjustable fulcrum pin for said brake lever and pivotally connected adjacent the opposite end to said spring plank and operative to position the fulcrum pin in accordance with the load carried by the vehicle, locking means comprising fluid pressure responsive means disposed interiorly of said bolster and operative by fluid under pressure supplied thereto to lock said member and thereby the adjustable pin in its adjusted position, and movable abutment means carried interiorly of said bolster and operatively connected to said member, said movable abutment means being responsive to an increase in fluid under pressure supplied thereto for first rocking said member to shift the fulcrum pin and for then supplying fluid under pressure to said locking means to lock said member and thereby said pin in the position to which it is shifted and to at the same time supply fluid under pressure to said brake cylinder device.

6. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, a member disposed below and extending transversely of said bolster, said member carrying adjacent one end thereof an adjustable fulcrum pin for said brake lever and pivotally connected adjacent the opposite end to said spring plank and operative to position the fulcrum pin in accordance with the load carried by the vehicle, locking means comprising fluid pressure responsive means disposed interiorly of said bolster and operative by fluid under pressure supplied thereto to lock said member and thereby the adjustable pin in its adjusted position, and movable abutment means carried interiorly of said bolster and operatively connected to said member, said movable abutment means being responsive to an increase in fluid under pressure supplied thereto for first rocking said member to shift the fulcrum pin and for then supplying fluid under pressure simultaneously to both the fluid pressure responsive means and the brake cylinder device, said fluid pressure responsive means being responsive to fluid under pressure at a value less than that required to effect operation of said brake cylinder device.

7. In a variable load brake apparatus for a vehicle of the type having a spring plank and a hollow truck bolster arranged for vertical movement relative to the spring plank in response to variations in the weight imposed thereon, in combination, a brake lever operative for effecting an application of the vehicle brakes, a brake cylinder device carried by and extending through said bolster operative by fluid under pressure supplied thereto for actuating said brake lever, an adjustable fulcrum pin for said brake lever having a position for empty vehicle braking and being movable therefrom to various other positions through a loaded vehicle zone for providing loaded vehicle braking, a member disposed below said bolster and pivotally connected at one end to said spring plank and operative to position said adjustable fulcrum pin in accordance with the load carried by the vehicle, a brake hanger and guide member carried by said bolster, a toothed bar disposed exteriorly of said bolster and slidably guided in said brake hanger and guide member, locking means carried interiorly of said bolster comprising a slidably mounted member operative for movement into locking engagement with said bar, and fluid pressure responsive means carried interiorly of said bolster and operative by an increase in the pressure of fluid supplied thereto for controlling the operation of said member and thereby said fulcrum pin, said locking means and the supply of fluid under pressure to said brake cylinder device.

SIDNEY G. DOWN.
CLYDE C. FARMER.